March 4, 1958 D. A. DIS ARIO 2,825,815

ELECTRONIC FOG PENETRATING APPARATUS

Filed Feb. 17, 1953 4 Sheets-Sheet 1

Inventor
Daniel A. Dis Ario
By Wallace and Cannon
Attorneys

Inventor
Daniel A. Dis Ario
By Wallace and Cannon
Attorneys

March 4, 1958 D. A. DIS ARIO 2,825,815

ELECTRONIC FOG PENETRATING APPARATUS

Filed Feb. 17, 1953 4 Sheets-Sheet 3

Inventor
Daniel A. DisArio
By Wallace and Cannon
Attorneys

Inventor
Daniel A. Dis Ario
By Wallace and Cannon
Attorneys 2,825,815
Patented Mar. 4, 1958

2,825,815

ELECTRONIC FOG PENETRATING APPARATUS

Daniel A. Dis Ario, Chicago, Ill., assignor, by mesne assignments, of one-half to Edwin T. Filippini and one-half to M. H. Stein Application February 17, 1953, Serial No. 337,259

8 Claims. (Cl. 250—83.3)

This invention relates to electronic fog penetrating apparatus, and particularly to such apparatus adapted to reproduce a fog-obscured image as a visible image.

While it is recognized that visible reproduction of a fog-obscured image may be accomplished by known devices, such devices are quite complicated, bulky and expensive so as to limit the use thereof to those situations where technical trained personnel are available and when cost and size are material considerations.

In view of the foregoing, it is the primary object to enable fog penetrating image reproducing apparatus to be so constructed that its size and cost are reduced while at the same time assuring good quality of reproduction of the fog-obscured image. Other and further objects are to afford such apparatus that is capable of effective and economical use in trains, boats, commercial or pleasure automobiles, aircraft and the like, and to enable such apparatus to be readily and easily disposed in the conventionally available space therein.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention.

Figure 1:
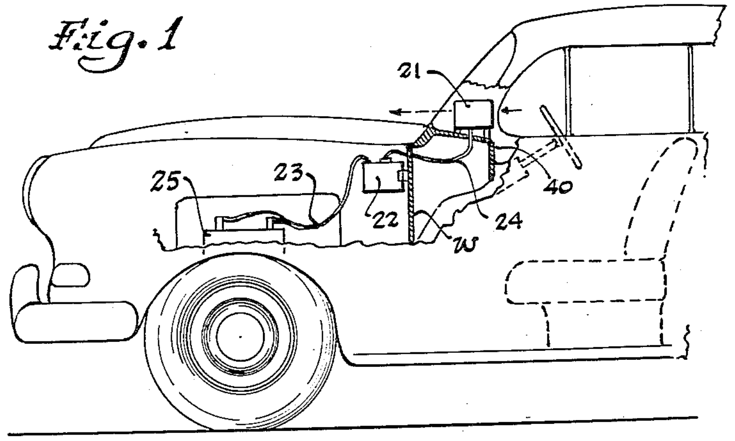
Fig. 1 is a side elevational view of an automobile equipped with a fog penetrating apparatus embodying the features of the invention.

For purposes of disclosure the invention is herein illustrated as embodied in fog-penetrating apparatus adapted particularly for use in a conventional pleasure automobile 20, and as thus embodied the apparatus comprises a fog penetrating and image reproducing unit 21 disposed within the enclosed passenger compartment of the vehicle in a position where the reproduced image may be viewed by the driver, and a power unit 22 disposed in any convenient location such as within the engine housing compartment of the vehicle on the forward side of the usual fire wall W. The power unit 22 in this embodiment obtains its electrical energy through means including a cable 23 from the battery 25 of the vehicle, and utilizes such energy to provide extremely high voltage direct current that is transmitted to the unit 21 by a cable 24.

The power unit 22 is, of course, matched to the energy source, and where this source constitutes a low voltage battery 25, the power unit includes a vibrator 26 for converting the direct current into alternating current that is stepped up to an extremely high voltage by a transformer 27. The high voltage output of the transformer 27 is rectified by a rectifier tube 28 and the rectified output of the tube is fed to a resistance-capacitance network afforded by a resistance R6 and a condenser 30, and then to direct current terminals 31 and 32 from which the primary connections for the apparatus are extended as will be explained. Such connections include a plurality of additional resistors R connected together to form a single resistance R6 (Fig. 10), and which are mounted in the power unit 22, and, resistors R1, R2 and R3, a rheostat R3, and a condenser 30–1 that are included in the unit 21.

The power unit 22 has a box-like casing comprising a relatively flat or thin cover or top 22T and a deep housing 22H, and the cover 22T serves as a chassis for the electrical elements of the power unit 22 so that such elements may be suspended within the housing 22H when the cover 22T is put in place. The housing 22H has mounting lugs 22L thereon so that the housing 22H may be readily mounted in a convenient location such as on the fire wall W of a vehicle, and the cover 22T is held in place on the housing 22H by screws 22S. In Figs. 6 to 9 the cover 22T is shown in its inverted position, and it will be observed that the various electrical elements of the power unit 22 are mounted on what amounts to the inside face of the cover 22T. Thus, the transformer 27 is mounted along one edge portion of such inside face, and the vibrator 26 in the present instance is mounted on the transformer 27. Adjacent the opposite end of the cover 22T the transformer 30 is mounted, and a terminal block or plug socket 33 is mounted along this same end of the cover so as to be accessible from the outside of the cover for connection of a plug connector 33P. In the space between the transformer and the condenser 30 a large block 34 of insulating material is mounted and this block 34 has a large number of the resistors R molded therein. In addition, the rectifier tube 28 is located within the block 34, either by molding permanently in the block, or by provision of a housing recess in the block 34 to receive and house the tube. This affords an effective electrical shielding for the tube and the resistors R. The resistance R6 is supported between the condenser 30 and the block by its leads in a conventional manner.

The particular way in which the various elements of the power unit are electrically associated with each other and with the unit 21 will be described in detail hereinafter.

Figure 2:
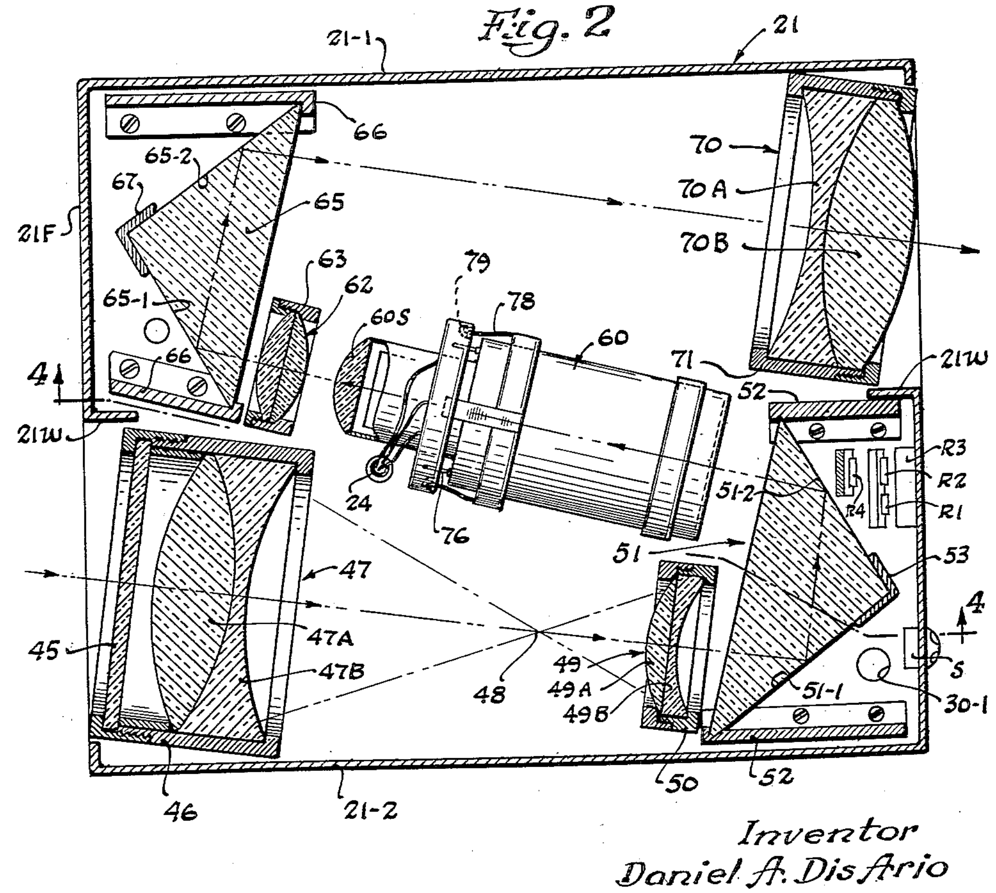
Fig. 2 is a plan section showing the internal construction of the fog penetrating and image reproducing unit of the apparatus.
Figure 3:
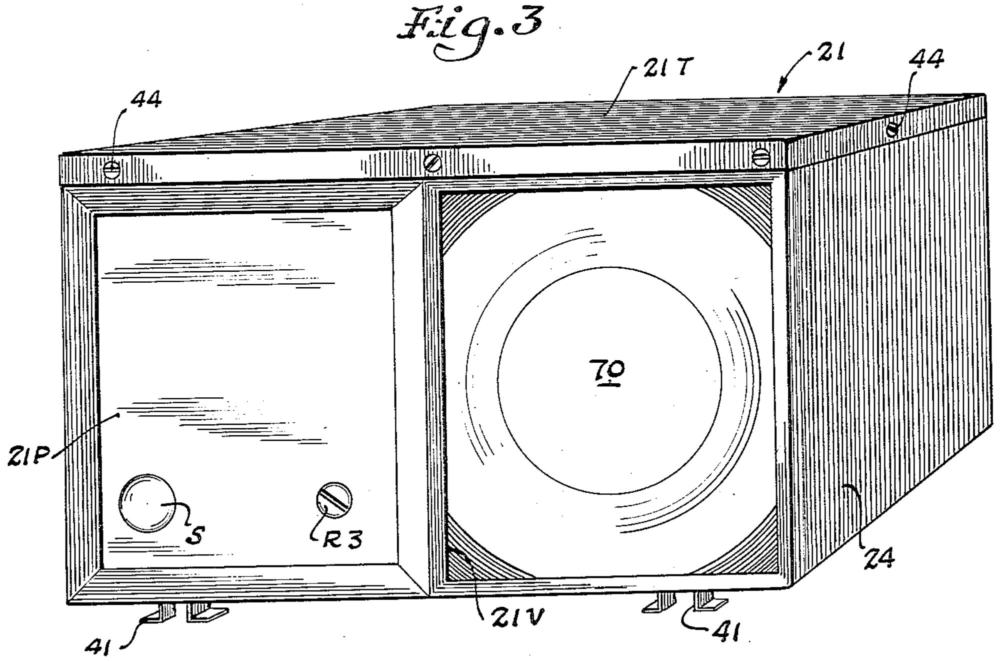
Fig. 3 is a perspective view of the rear or viewing end of such unit.
Figure 4:
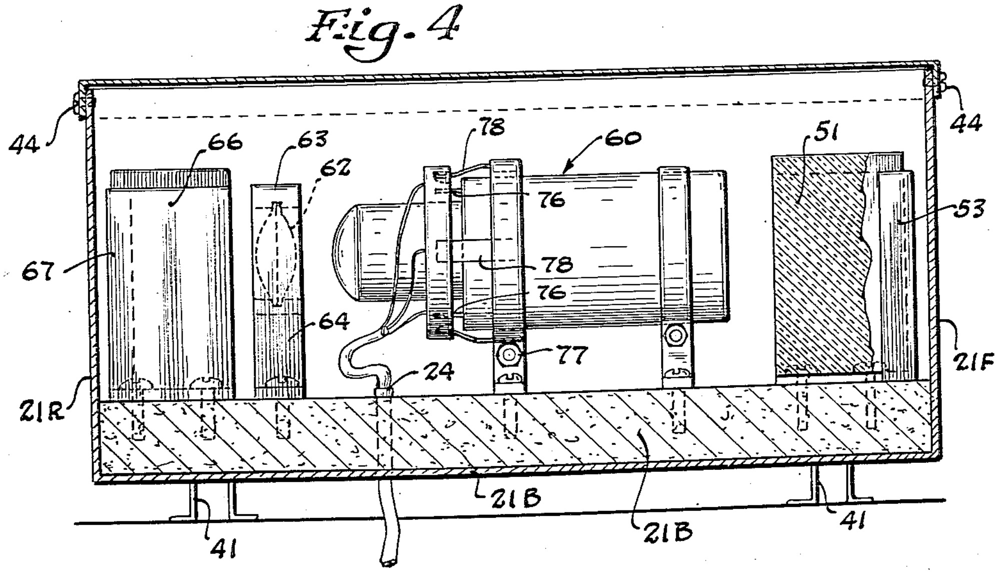
Fig. 4 is a vertical sectional view taken along the line 4—4 of Fig. 2.
Figure 5:
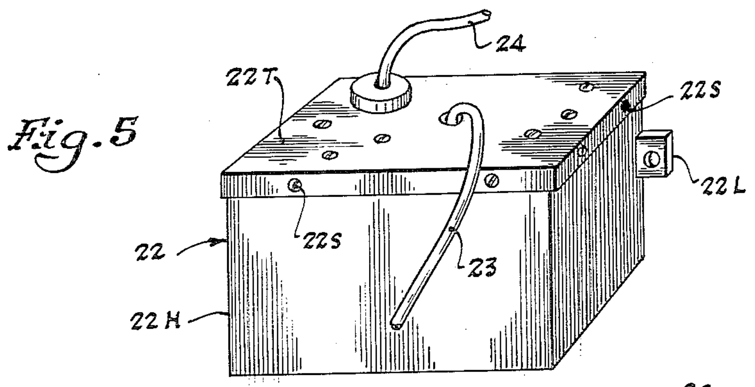
Fig. 5 is a perspective view of the power unit of the apparatus.
Figure 6:
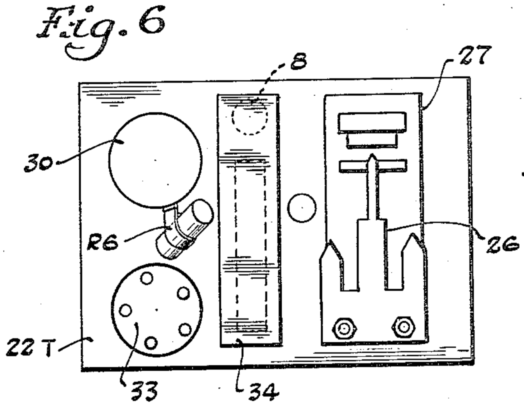
Figs. 6, 7, 8 and 9 are plan, right end, side, and left end views, respectively, of the chassis of the power unit, shown in inverted position in each instance.
Figure 8:
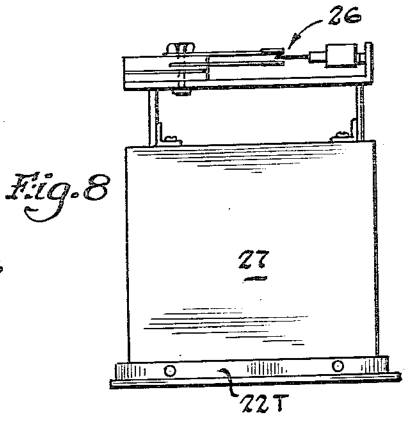
Figure 7:
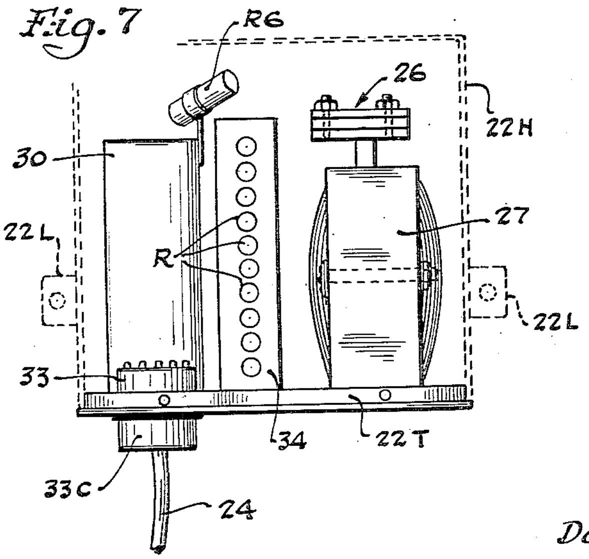
Figure 9:
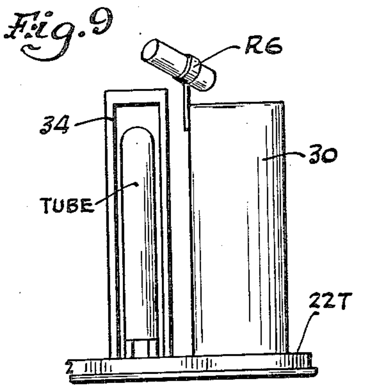

The viewing unit 21 is box-like in form, and is relatively small so that it may be supported on the dash or cowl 40 of an automobile by means such as resilient mounting feet 41. The unit 21, as shown in detail in Figs. 2, 3 and 4, comprises an open topped box-like structure having a bottom wall 21B, a front wall 21F that faces toward the front of the vehicle, a rear wall 21R that faces rearwardly toward the operator, and right and left hand side walls 21–1 and 21–2, and a removable flanged top or cover 21T is afforded which is held in place over the open top of the lower structure by means including screws 44. The bottom wall 21B has a filler of appreciable thickness on its inner face, as at 21X. In its rear wall, that is the wall that faces rearwardly toward the driver of the vehicle 20, the unit 21 has a left hand closed control panel 21P on which operating instructions may be placed and on which a slotted focusing adjustment for the rheostat R2 is exposed, and on which an operating handle S for the off-on switch is disposed. To the right of the panel 21P, the rear wall of the cabinet has an opening 21V in which the final image is reproduced or viewed, as will be hereinafter described.

In its front wall, and in the half thereof that is adjacent to the left side wall 21–2, the cabinet has a forward opening 21W through which the apparatus receives the light which is to be reproduced as a visible image in the viewing opening 21V.

Under and in accordance with the present invention, the light from the image enters the opening 21W and passes through an infra red filter 45 which, in the present instance, is mounted in a common lens holder 46 with a multiple-element lens 47. This lens 47 in the present embodiment comprises a double convex lens through which the light first passes, and a double concave lens through which the light next passes. This lens or lens system 47 has a focal point 48, and from this focal point the light passes into a second lens system 49 that in the present instances comprises two elements 49A and 49B, held in face to face contact in a lens holder 50. The image thus is subjected to a complete reversal by the lens system 47. The light passes through the lens system 49, enters a prism 51 that has a first reflecting surface 51–1 and a second reflecting surface 51–2. This prism is held in place by a pair of brackets 52 against a mounting angle 53. The axis of the image passing through the lens 47 and the lens 49 strikes the reflecting surface 51–1 so that the image undergoes a right to left hand reversal and strikes the reflecting surface 51–2 from which the image is reflected with a second right to left hand reversal along the axis of an image converting tube 60. This image converting tube 60 is of the kind that is described in detail in my copending application, Serial No. 333,504, filed January 27, 1953. Within the image converting tube 60 the image is subjected to a complete reversal and is reproduced as a visible image on fluorescent screen 60S, that is located at the left hand end of the tube 60. On the outside of the screen 60S, a lens 60L is fixed, and the image is transmitted on through this lens 60L and through a lens system such as a double convex lens 62. The lens 62 is supported within the unit by a lens holder 63 and a supporting bracket 64 that is mounted on the bottom of the housing. The image is transmitted through the lens 62 and into a second prism 65 that has reflecting surfaces 65–1 and 65–2. The prism 65 is mounted by means of brackets 66 and a rear angle 67. The image strikes the surface 65–1 and is reflected across the prism to the surface 65–2 from which it is further reflected toward the opening 21V. Within the opening 21V a lens 70 is mounted, this lens having a holder 71 and in the present instance comprising a lens section 70A and a double convex section 70B.

The image that is passed through the infra red filter 45 is, of course, invisible to the human eye and the infra red light image acts on the tube 60 so that this infra red light image is converted into a fluorescent visible image at the screen 60S, as explained in my aforesaid copending application. This visible image at the screen 60S is, in effect, transmitted by the lenses 60L and 62 and by reflecting prism surfaces 65–1 and 65–2 and the lens 70 to the viewer who is looking at the outer face of the lens 70. The output of the tube 60 constitutes a relatively strong and clear image and enables the driver of the vehicle to visualize conditions ahead of the vehicle, even though the objects that are ahead of the vehicle are obscured by fog.

As pointed out in my aforesaid copending application, the tube 60 includes a cathode K and four anodes A1 to A4, and these anodes and the cathode are, of course, electrically associated with the power unit 22, as will now be described.

The connecting cable 24 is preferably constructed with a very heavy and effective insulation by reason of the high voltages that are to be carried by certain of the wires of the cable, and two high voltage wires and three low or lower voltage connecting wires are included in this cable 24. At its free end this cable terminates in the connector plug 33C, while at its other end this cable 24 extends into the unit 21 and terminates in a connector ring 75 having contacts therein for association with the projecting connector pins 76 of the tube 60. The tube 60 is supported in the housing 21 by means of a pair of brackets 77, and the forward one of these brackets has a plurality of spring arms 78 formed thereon which are arranged to engage suitable sockets 79 in the terminal ring 75.

Figure 10:
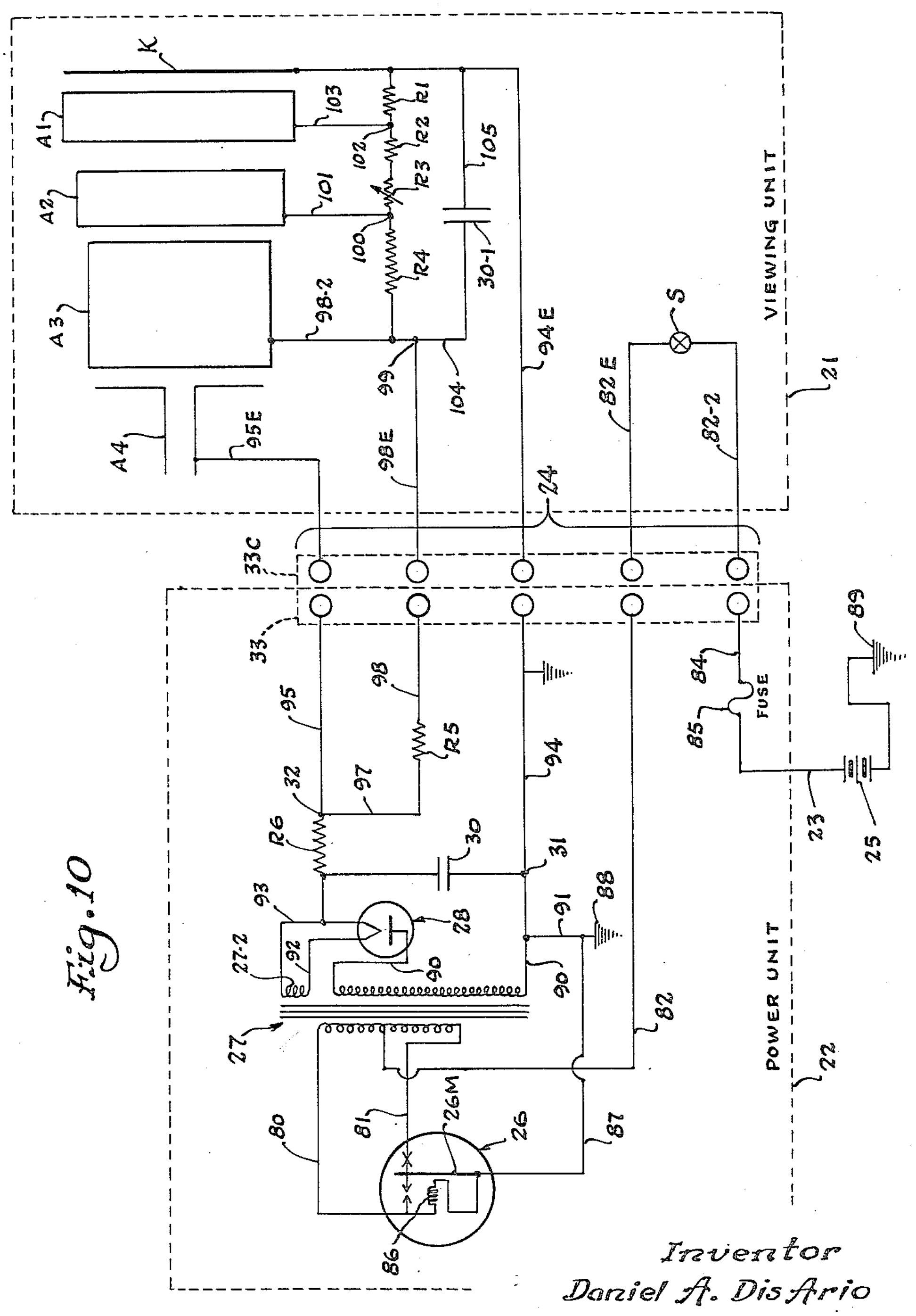
Fig. 10 is a schematic wiring diagram of the apparatus.

As shown in Fig. 10, the vibrator 27 has its opposite stationary contacts connected by wires 80 and 81 to opposite ends of the primary of the transformer 27, while a wire 82 is extended from a center tap on the primary of the transformer 27 to the terminal plug 33. This circuit is extended through a wire 82E from the plug 33P as a part of the cable 24 and to one contact of the switch S, while a wire 82–2 extends circuit from the other contact of the switch S back to the plug 33P. The circuit is then extended by a wire 83, a fuse 84, a fuse 85 and the cable 23 to the ungrounded terminal of the battery 25. The vibrator 26 has an operating coil 86, connected between the wire 80 and the movable contact 26M of the vibrator, and this movable contact 26M is connected by a wire 87 to ground at 88, it being noted that the other terminal of the battery 25 is grounded at 89. Thus the switch S serves as an off-on switch for the vibrator 26. The main secondary coil 27–1 of the transformer 27 has one end connected by wire 90 to the plate of the rectifier tube 28, while the filament of the tube is connected by wires 92 and 93 to opposite ends of a small secondary coil 27–2. The other end of the secondary coil 27–1 is connected by wires 94 and 95 to the chassis ground 88, while the wire 93 is connected by the resistor R6 to the positive terminal 32. The condenser 30 is connected between the terminal 31 and the end of the resistor R6 that is electrically adjacent to the filament of the tube 28, and the condenser 30 and the resistance R6 serve to filter the output of the tube 28 and afford an extremely high voltage direct current source across the terminals 31 and 32. The negative terminal 31 of this source is connected by a wire 94 to the terminal block 33, and this circuit is extended by an extension 94E from the plug 33C to the cathode K of the image converting tube 60. The positive side of the direct current source is extended from the terminal 32 by a wire 95 to the terminal block 33, and the circuit is further extended from the plug 33C by a wire 95E to the high voltage anode A4 of the tube.

Voltages are applied to the other anodes A1, A2 and A3 through a voltage dividing network that includes the resistors R1 to R5, as will now be described, and this network applies voltages to the elements of the tube 60 of the order set forth in my aforesaid copending application. Thus, the resistor R5 is connected between the terminal 32 and the terminal block 33 by wires 97 and 98, while circuit is extended by a wire 98E from the plug 33C to a terminal 99 from which a further extension 98–2 extends the circuit to the anode A3. One end of the resistor R4 is connected to the terminal 99, while the other end of this resistor is connected to a terminal 100. A wire 101 extends from this terminal to the anode A2. The resistances R2 and R3 are connected in series from the terminal 100 to a terminal 102, it being noted that the resistance R3 is the adjustable rheostat by means of which the tube 60 is focused. A wire 103 connects the terminal 102 to the anode A1. The resistance R1 is connected between the terminal 102 and the wire 94E.

The condenser 30–1 is connected by wires 104 and 105 between the terminal 99 and the wire 94E, and this condenser is thus located across the lower voltage portion of the voltage dividing network. Hence, this condenser has an efficient filtering action and causes improved operation of the picture tube 60.

From the foregoing description, it will be apparent that the present invention affords a fog penetrating image reproducing apparatus that is quite compact as to size, and which is capable of economical manufacture. Moreover, it will be evident that this apparatus is adapted for convenient installation and use in any of the various types of land, air or water vehicles.

The apparatus of the present invention affords a clear image of things that may be ahead of such vehicles, even though such things are obscured by fog, and hence it renders the operation of such vehicles more practical and convenient.

Thus, while I have illustrated and described the preferred embodiment of my invention, it is to be understood that this is capable of variation and modification.

I claim:

1. In a fog penetrating apparatus, a viewing unit comprising a casing having top, bottom, side and front and rear walls, said front and rear walls each having a relatively large opening formed therein with one opening adjacent one of said side walls and the other opening adjacent the other of said side walls, front and rear reflecting means disposed within said casing adjacent to said front and rear walls and arranged so that light entering the opening in said front wall along a first path is reflected laterally and then forwardly along an intermediate path, and then laterally and rearwardly along a final path toward the opening in said rear wall, a lens system and an infra red filter disposed along said first path, an image converter tube disposed along said intermediate path and including a fluorescent screen upon which a visible image may be produced, a lens system disposed between said screen and said front reflecting means, and a lens system disposed in the opening in said rear wall to receive the image and afford a viewing area.

2. In a fog penetrating apparatus, a viewing unit comprising a casing having top, bottom, side and front and rear walls, said front and rear walls each having a relatively large opening formed therein with one opening adjacent one of said side walls and the other opening adjacent the other of said side walls, front and rear reflecting means disposed within said casing adjacent to said front and rear walls and arranged so that light entering the opening in said front wall along a first path is reflected laterally and then forwardly along an intermediate path, and then laterally and rearwardly along a final path toward the opening in said rear wall, a lens system disposed along said first path, an image converter tube disposed along said intermediate path and including a fluorescent screen upon which a visible image may be produced, a lens system disposed between said screen and said front reflecting means, a lens system disposed in the opening in said rear wall to receive the image and afford a viewing area, and an infra red filter located on one of said first two paths to limit the light impressed on said tube to the infra red range.

3. In a fog penetrating apparatus, a viewing unit comprising a casing having top, bottom, side and front and rear walls, said front and rear walls each having a relatively large opening formed therein with one opening adjacent one of said side walls and the other opening adjacent the other of said side walls, front and rear reflecting means disposed within said casing adjacent to said front and rear walls and arranged so that light entering the opening in said front wall along a first front to rear path is reflected alternately along a succession of lateral and longitudinal paths terminating in a final path directed toward the opening in said rear wall, a lens system and an ultra violet filter disposed along said first path and arranged to effect a full image reversal, an image converter tube disposed along one of said succession of paths and arranged to effect a full image reversal and including a fluorescent screen upon which a visible image may be produced, a lens system disposed between said screen and said front reflecting means, and a lens system disposed in the opening in said rear wall to receive the image and afford a viewing area.

4. In a fog penetrating apparatus, a viewing unit comprising a casing having top, bottom, side and front and rear walls, said front and rear walls each having a relatively large opening formed therein with one opening adjacent one of said side walls and the other opening adjacent the other of said side walls, front and rear reflecting means disposed within said casing adjacent to said front and rear walls and arranged so that light entering the opening in said front wall along a first front to rear path is reflected alternately along a succession of lateral and longitudinal paths terminating in a final path directed toward the opening in said rear wall, a lens system and an ultra violet filter disposed along said first path and arranged to effect a full image reversal, an image converter tube disposed along one of said succession of paths and arranged to effect a full image reversal and including a fluorescent screen upon which a visible image may be produced.

5. In a fog penetrating apparatus, a viewing unit comprising a casing having top, bottom, side and front and rear walls, said front and rear walls each having a relatively large opening formed therein with one opening adjacent one of said side walls and the other opening adjacent the other of said side walls, front and rear reflecting means disposed within said casing adjacent to said front and rear walls and arranged so that light entering the opening in said front wall along a first front to rear path is reflected alternately along a succession of lateral and longitudinal paths terminating in a final path directed toward the opening in said rear wall, a lens system and an ultra violet filter disposed along said first path and arranged to effect a full image reversal, an image converter tube disposed along one of said succession of paths and arranged to effect a full image reversal and including a fluorescent screen upon which a visible image may be produced, a magnifying lens system disposed between said screen and said front reflecting means, and a lens system disposed in the opening in said rear wall to receive the image and afford a viewing area.

6. In an electronic fog penetrating apparatus for use in vehicles having an operator's seat, said apparatus comprising a viewing unit adapted to be disposed in front of such an operator's seat and a power unit adapted to be mounted in a remote location in the vehicle, said power unit comprising a step-up transformer and a rectifier and a D. C. filter circuit, and also including a first resistor forming part of a voltage dividing network, said viewing unit comprising a cabinet having an image converter tube therein, means for directing an infra red light image on said tube and said tube having means including a photo-emissive cathode and a plurality of anodes forming part of said tube and effective to convert such image into a visible image, a focusing rheostat and a plurality of other resistors in said viewing unit, and a connecting cable extending between said units and connecting said first resistor, said rheostat and said other resistors as a voltage dividing network and connecting said cathode and said anodes to said network.

7. In an electronic fog penetrating apparatus for use in vehicles having an operator's seat, said apparatus comprising a viewing unit adapted to be disposed in front of such an operator's seat and a power unit adapted to be mounted in a remote location in the vehicle, said power unit comprising a step-up transformer and a rectifier and a D. C. filter circuit, and also including a first resistor forming part of a voltage dividing network, said viewing unit comprising a cabinet having an image converter tube therein, means for directing an infra red light image on said tube and said tube having means including a photo-emissive cathode and a plurality of anodes forming part of said tube and effective to convert such image into a visible image, a focusing rheostat and a plurality of other resistors in said viewing unit, and a connecting cable extending between said units and connecting said first resistor, said rheostat and said other resistors as a voltage dividing network and connecting said cathode and said anodes to said network, and a supplemental filtering condenser connected across the lower voltage section of such network that is electrically adjacent to said cathode.

8. In an electronic fog penetrating apparatus for use in vehicles having an operator's seat, said apparatus comprising a viewing unit adapted to be disposed in front of such an operator's seat and a power unit adapted to be mounted in a remote location in the vehicle, said power unit comprising a vibrator operable from a D. C. source, a step-up transformer, a rectifier and a D. C. filter circuit, and also including a first resistor adapted to form part of a voltage dividing network, said viewing unit comprising a cabinet having an image converter tube therein, means for directing an infra red light image on said tube, means including a photo-emissive cathode and a plurality of anodes forming part of said tube and effective to convert such an infra red image into a visible image, a focusing rheostat and a plurality of other resistors in said viewing unit, a connecting cable extending between said units and connecting said rheostat and said resistors as a voltage dividing network and connecting said cathode and said anodes to said network, an off-on switch forming part of said viewing unit, and connections from said switch forming part of said cable for controlling said vibrator to turn the same off and on.

References Cited in the file of this patent

UNITED STATES PATENTS

| | | |
|---|---|---|
| 2,158,405 | Coanda | May 16, 1939 |
| 2,363,600 | Lawlor | Nov. 28, 1944 |
| 2,454,841 | Sackville | Nov. 30, 1948 |